US012590345B2

(12) United States Patent
Kim et al.

(10) Patent No.: US 12,590,345 B2
(45) Date of Patent: Mar. 31, 2026

(54) COLD-ROLLED STEEL SHEET FOR FLUX-CORED WIRE AND METHOD FOR PRODUCING SAME

(71) Applicant: POSCO, Pohang-si (KR)

(72) Inventors: Jai-Ik Kim, Gyeongsangbuk-do (KR); Jea-Chun Jeon, Gyeongsangbuk-do (KR)

(73) Assignee: POSCO, Pohang-si (KR)

( * ) Notice: Subject to any disclaimer, the term of this patent is extended or adjusted under 35 U.S.C. 154(b) by 936 days.

(21) Appl. No.: 17/783,862

(22) PCT Filed: Dec. 16, 2020

(86) PCT No.: PCT/KR2020/018457
§ 371 (c)(1),
(2) Date: Jul. 22, 2022

(87) PCT Pub. No.: WO2021/125792
PCT Pub. Date: Jun. 24, 2021

(65) Prior Publication Data
US 2023/0014632 A1     Jan. 19, 2023

(30) Foreign Application Priority Data
Dec. 20, 2019    (KR) ........................ 10-2019-0171743

(51) Int. Cl.
| | |
|---|---|
| *C21D 8/0221* | (2026.01) |
| *B23K 35/02* | (2006.01) |
| *C21D 8/0247* | (2026.01) |
| *C21D 9/46* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |

(52) U.S. Cl.
CPC ........ *C21D 8/0236* (2013.01); *B23K 35/0266* (2013.01); *C21D 8/0226* (2013.01); *C21D 8/0273* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/08* (2013.01)

(58) Field of Classification Search
CPC .. C21D 8/0236; C21D 8/0226; C21D 8/0273; C21D 9/46; C21D 8/02; B23K 35/0266; B23K 35/02; C22C 38/001; C22C 38/002; C22C 38/004; C22C 38/02; C22C 38/04; C22C 38/06; C22C 38/08; C22C 38/00; B21B 1/24
USPC ....................................................... 148/602
See application file for complete search history.

(56) References Cited

U.S. PATENT DOCUMENTS

2017/0266751 A1    9/2017  Hirasawa et al.

FOREIGN PATENT DOCUMENTS

| | | |
|---|---|---|
| CN | 106425161 A | 2/2017 |
| JP | S61-253195 A | 11/1986 |
| JP | S63-2592 A | 1/1988 |
| JP | H01-294822 A | 11/1989 |
| JP | H07-9191 A | 1/1995 |
| JP | 2003-049239 A | 2/2003 |
| JP | 2007-009235 A | 1/2007 |
| JP | 2008-87043 A | 4/2008 |
| JP | 2009-248175 A | 10/2009 |
| JP | 2011-152579 A | 8/2011 |
| JP | 2014-201766 A | 10/2014 |
| JP | 5874864 B1 | 3/2016 |
| JP | 2019-534382 A | 11/2019 |
| JP | 2020-525647 A | 8/2020 |
| KR | 10-2002-0010050 A | 2/2002 |
| KR | 10-2006-0107910 A | 10/2006 |
| KR | 10-2016-0129038 A | 11/2016 |
| KR | 10-1795970 B1 | 11/2017 |
| KR | 10-2019-0073200 A | 6/2019 |
| KR | 10-2019-0137300 A | 12/2019 |
| WO | WO-2019132362 A1 * | 7/2019 ............. C22C 38/12 |

OTHER PUBLICATIONS

[JP2011152579A] (Machine Translation) (Year: 2011).*
Kim Jai-Ik [WO2019132362A1] (Machine translation) (Year: 2019).*
Muto Akifumi et al. [JP2007009235] (Machine translation) (Year: 2007).*
Ahn Seung Gae [KR20020010050A] (Machine translation) (Year: 2002).*
Hasegawa Toshinga et.al. [JP2011152579A] (Machine translation) (Year: 2011).*
Office Action issued Sep. 5, 2023 for corresponding application Japanese Patent Application No. 2022-538237.
International Search Report (with partial English translation) and Written Opinion dated May 27, 2021 issued in International Patent Application No. PCT/KR2020/018457.
French et al., "A Comparison of Pulsed and Conventional Welding with Basic Flux Cored and Metal Cored Welding Wires", Welding Research Supplement, pp. 197-205, Jun. 1995.

* cited by examiner

*Primary Examiner* — Sally A Merkling
*Assistant Examiner* — Nazmun Nahar Shams
(74) *Attorney, Agent, or Firm* — Morgan Lewis & Bockius LLP

(57) ABSTRACT

The present embodiments relate to a cold-rolled steel sheet for a flux-cored wire and a method for manufacturing the same. According to an exemplary embodiment, a cold-rolled steel sheet for a flux-cored wire, including: by wt %, 0.0005 to 0.01% of carbon (C), 0.05 to 0.25% of manganese (Mn), 0.03% or less (except for 0%) of silicon (Si), 0.0005 to 0.01% of phosphorus (P), 0.001 to 0.008% of sulfur (S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities, can be provided.

14 Claims, No Drawings

COLD-ROLLED STEEL SHEET FOR FLUX-CORED WIRE AND METHOD FOR PRODUCING SAME

CROSS-REFERENCE OF RELATED APPLICATIONS

This application is the U.S. National Phase under 35 U.S.C. § 371 of International Patent Application No. PCT/KR2020/018457, filed on Dec. 16, 2020, which in turn claims the benefit of Korean Application No. 10-2019-0171743, filed on Dec. 20, 2019, the entire disclosures of which applications are incorporated by reference herein.

TECHNICAL FIELD

The present invention relates to a cold-rolled steel sheet for a flux-cored wire and a method for manufacturing the same. More specifically, the present embodiments relate to a cold-rolled steel sheet for a flux-cored wire in which strength, low-temperature toughness, welding workability and workability characteristics are remarkably improved by optimizing the content of alloying elements, and a method for manufacturing the same.

BACKGROUND ART

In general, there is a flux cored welding (FCW) method as a welding method in which welding productivity is highest and welding is easily performed at various positions. A welding material used in the FCW method is a flux-cored wire, and is prepared by processing a strip obtained by drawing a cold-rolled steel sheet for a welding rod into a U-shape, and then adding flux to the processed U-shaped tube.

A carbon steel-based cold-rolled steel sheet is typically used as a cold-rolled steel sheet for a flux-cored wire used in the manufacture of such a flux-cored wire, and stainless steel is used for some special uses.

Since a carbon steel-based cold-rolled steel sheet for a flux cored wire is low-alloy steel, in addition to a basic flux component filled inside the core, a large amount of alloying elements for securing the usage characteristics need to be added in order to secure the characteristics of the flux cored wire depending on the use environment.

However, when the content of the alloying element for securing the use characteristics of the welding rod is increased as described above, there is a problem in that it is difficult to secure stable welding characteristics because the flux component and the like are limited. In addition, as most of these alloying elements are added in the form of a high-purity powder, these added alloying elements not only cause an increase in cost, but also have high specific gravities, so that there is a problem in that the additive components melted during welding act as a factor of welding defect such as causing segregation of a welded portion.

For example, as one of the methods for manufacturing a steel sheet for a flux-cored wire, a method for manufacturing a steel for a welding rod having excellent impact toughness and strength by adding titanium (Ti) or the like has been presented. However, the method has a problem in that the manufacturing cost increases as a large amount of expensive alloying elements are added, and also has a problem in that it is difficult to secure the drawability due to low ductility.

Further, a technique has been proposed, in which welding defects are reduced by adding titanium (Ti), magnesium (Mg) and the like to a flux raw material to promote the deoxidation reaction of a molten metal. However, many alloying elements need to be added to the flux in order to sufficiently obtain the deoxidizing effect of the molten metal, but there is a problem in that when such a large number of alloying elements are added to the flux, welding workability deteriorates, such as occurrence of many spatter phenomena in which fine particles are ejected to the surrounding area during welding.

Therefore, there is a need for developing a welded steel strip using a cold-rolled steel sheet for a flux-cored wire, which is capable of obtaining a welded portion having excellent strength and low-temperature toughness and has excellent welding workability and drawability in an extremely low-temperature environment, and a method for manufacturing the same.

DISCLOSURE

Technical Problem

The present embodiment has been made in an effort to provide a cold-rolled steel sheet for a flux-cored wire, in which strength, low-temperature toughness, welding workability and workability are remarkably improved by adding a suitable amount of nickel (Ni), boron (B) and the like, and a method for manufacturing the same.

Technical Solution

A cold-rolled steel sheet for a flux-cored wire according to an exemplary embodiment may include: by wt %, 0.0005 to 0.01% of carbon (C), 0.05 to 0.25% of manganese (Mn), 0.03% or less (except for 0%) of silicon (Si), 0.0005 to 0.01% of phosphorus (P), 0.001 to 0.008% of sulfur (S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities.

A method for manufacturing a cold-rolled steel sheet for a flux-cored wire according to another exemplary embodiment may include: manufacturing a slab including: by wt %, 0.0005 to 0.01% of carbon (C), 0.05 to 0.25% of manganese (Mn), 0.03% or less (except for 0%) of silicon (Si), 0.0005 to 0.01% of phosphorus (P), 0.001 to 0.008% of sulfur (S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities, heating the slab, obtaining a hot-rolled steel sheet by hot rolling the heated slab such that a finishing hot rolling temperature is 890 to 950° C., winding the hot-rolled steel sheet in a temperature range of 550 to 700° C., obtaining a cold-rolled steel sheet by cold rolling the wound hot-rolled steel sheet at a rolling reduction ratio of 50 to 85%, and annealing the cold-rolled steel sheet in a temperature range of 700 to 850° C.

Advantageous Effects

Since the cold-rolled steel sheet for a flux-cored wire according to an exemplary embodiment remarkably improves workability and productivity by appropriately controlling the alloy component and simultaneously, easily secures welding workability by stabilizing a flux component, the efficiency of work can be dramatically improved.

Further, according to an exemplary embodiment, the cold-rolled steel sheet for a flux-cored wire used in the shipbuilding industry, the materials industry, the construction industry, and the like can be manufactured at low cost.

MODE FOR INVENTION

Terms such as first, second and third are used to describe various parts, components, regions, layers and/or sections, but are not limited thereto. These terms are used only to distinguish one part, component, region, layer or section from another part, component, region, layer or section. Thus, a first part, component, region, layer, or section to be described below could be termed a second part, component, region, layer, or section within a range not departing from the scope of the present invention.

The terminology used herein is solely for reference to specific exemplary embodiments and is not intended to limit the present invention. The singular forms used herein also include the plural forms unless the phrases do not express the opposite meaning explicitly. As used herein, the meaning of "include" specifies a specific feature, region, integer, step, action, element and/or component, and does not exclude the presence or addition of another feature, region, integer, step, action, element, and/or component.

When a part is referred to as being "above" or "on" another part, it may be directly above or on another part or may be accompanied by another part therebetween. In contrast, when one part is referred to as being "directly above" another part, no other part is interposed therebetween.

Although not differently defined, all terms including technical terms and scientific terms used herein have the same meaning as the meaning that is generally understood by a person with ordinary skill in the art to which the present invention pertains. The terms defined in generally used dictionaries are additionally interpreted to have the meaning matched with the related art document and currently disclosed contents, and are not interpreted to have an ideal meaning or a very formal meaning as long as the terms are not defined.

Further, unless otherwise specified, % means wt %, and 1 ppm is 0.0001 wt %.

In an exemplary embodiment of the present invention, further including an additional element means that the additional element is included while replacing iron (Fe) that is the balance by an additional amount of the additional element.

Hereinafter, exemplary embodiments of the present invention will be described in detail with reference to the accompanying drawings such that a person with ordinary skill in the art to which the present invention pertains can easily carry out the present invention. However, the present invention may be implemented in various different forms, and is not limited to the exemplary embodiments described herein.

A cold-rolled steel sheet for a flux-cored wire according to an exemplary embodiment of the present invention may include: by wt %, 0.0005 to 0.01% of carbon (C), 0.05 to 0.25% of manganese (Mn), 0.03% or less (except for 0%) of silicon (Si), 0.0005 to 0.01% of phosphorus (P), 0.001 to 0.008% of sulfur (S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities.

Hereinafter, the reasons for limiting the components of the cold-rolled steel sheet will be described.

C: 0.0005 to 0.01 wt %

Carbon (C) is an element added to improve the strength of steel, and is an element added to make a welding heat affected zone have characteristics similar to those of a base material. When the content of C is too low, the above-described effects are insufficient. In contrast, when the content of C is too high, problems such as disconnection may occur during a drawing process due to high strength or work hardening. Further, there are disadvantages in that a cold-rolled steel sheet can be processed into a target final product only when a plurality of heat treatments is performed because not only low-temperature cracks occur in welded joints or impact toughness decreases, but also hardness is high. Accordingly, the content of C may be 0.0005 to 0.01 wt %. More specifically, for example, the content of carbon (C) may be in a range of 0.0005 to 0.008 wt %, 0.0005 to 0.005 wt %, or 0.001 to 0.005 wt %. When the carbon content satisfies the above range, the characteristics of the welding heat affected zone may be further improved.

Mn: 0.05 to 0.25 wt %

Manganese (Mn) is a solid solution strengthening element, and serves to increase the strength of steel and improve hot workability. However, when manganese is added in an excessive amount, the ductility and workability of a steel may be inhibited by forming a large amount of manganese-sulfide (MnS) precipitates. When the content of Mn is too low, it may cause red shortness and it may be difficult to contribute to the stabilization of austenite. In contrast, when the content of Mn is too high, the ductility deteriorates and the too high content of Mn acts as a factor for the occurrence of center segregation, so that it is possible to induce disconnection during the drawing work in a process of manufacturing a welding rod. Accordingly, the content of Mn may be 0.05 to 0.25 wt %. More specifically, for example, the content of Mn may be 0.07 to 0.20 wt %.

Si: 0.03 wt % or Less

Silicon (Si) not only may serve as a factor which degrades the surface characteristics and reduce corrosion resistance by combining with oxygen to form an oxide layer on the surface of a steel sheet, but also serves as a factor which degrades low-temperature impact characteristics by promoting a hard phase transformation in the weld metal. Accordingly, the content of Si is limited to 0.03 wt % or less. More specifically, for example, the content of Si may be 0.001 to 0.030 wt % or 0.001 to 0.0020 wt %.

P: 0.0005 to 0.01 wt %

Phosphorus (P) is an element which improves strength and hardness by causing solid solution strengthening while being present as a solid solution element in steel. When the content of P is too low, it may be difficult to maintain a certain level of rigidity. When the content of P is too high, center segregation occurs and ductility deteriorates during casting, so that the wire workability may be inferior. Accordingly, the content of P may be 0.0005 to 0.01 wt %. More specifically, for example, the content of P may be 0.001 to 0.008 wt %.

S: 0.001 to 0.008 wt %

Since sulfur (S) combines with manganese in the steel to form non-metal inclusions and causes red shortness, it is desirable to lower the content thereof as much as possible. In addition, when the content of S is too high, there may be a problem of reducing the toughness of the base material of the steel sheet. Accordingly, the content of S may be 0.001 to 0.008 wt %. More specifically, for example, the content of S may be 0.0015 to 0.007 wt %.

Al: 0.0001 to 0.010 wt %

Aluminum (Al) is an element added for the purpose of preventing a material from deteriorating by a deoxidizer and aging in an aluminum killed steel, and is also advantageous for securing ductility, and such an effect is more remarkable at extremely low temperature. When the content of Al is too low, the above-described effects are insufficient. In contrast, when the content of Al is too high, surface inclusions such as aluminum-oxide (Al2O3) are rapidly increased to cause the surface characteristics of a hot-rolled material to deteriorate, and not only the workability deteriorates, but also ferrite is locally formed at the crystal grain boundary of the welding heat affected zone, so that mechanical characteristics may deteriorate. Furthermore, there may be a problem in that the shape of the weld bead deteriorates after welding. Accordingly, the content of Al may be 0.0001 to 0.010 wt %. More specifically, for example, the content of Al may be 0.0005 to 0.0100 wt %, 0.001 to 0.007 wt % or 0.001 to 0.006 wt %.

N: 0.0005 to 0.003 wt %

Nitrogen (N) is an element that is effective for strengthening materials while being present in a solid solution state in steel. When N is included in too small an amount, it may be difficult to secure the target rigidity. In contrast, when the content of N is too high, not only the aging properties deteriorates sharply, but also the burden due to denitrification increases in the steel manufacturing step, and the steelmaking workability may deteriorate. Accordingly, the content of N may be 0.0005 to 0.003 wt %. More specifically, for example, the content of N may be 0.001 to 0.0027 wt %.

Ni: 0.5 to 1.7 wt %

Nickel (Ni) is an element which is not only effective for improving the drawability by improving the ductility, but also required to improve low-temperature impact characteristics by forming a stable structure even at extremely low temperature. In order to obtain the aforementioned effects and simultaneously stably control the flux composition, Ni may be included in an amount of 0.5 wt % or more. However, when the content of Ni is too high, not only the drawability deteriorates due to an increase in strength, but also surface defects may be induced. Further, when a large amount of fundamentally expensive Ni is added, the steelmaking cost may remarkably increase. Accordingly, the content of Ni may be 0.5 to 1.7 wt %. More specifically, for example, the content of Ni may be 0.5 to 1.6 wt %, 0.6 to 1.6 wt %, or 0.7 to 1.5 wt %.

B: 0.0005 to 0.0030 wt %

Boron (B) is an element that is advantageous in terms of securing the strength of welded joints by enhancing hardenability. When B is included in too small an amount, it may be difficult to secure strength. In contrast, when B is included in too large an amount, there may occur a problem in that by increasing the recrystallization temperature, not only the annealing workability is lowered, but also the workability is remarkably lowered. Accordingly, the content of B may be 0.0005 to 0.0030 wt %. More specifically, for example, the content of B may be 0.0002 to 0.004 wt %, 0.0005 to 0.0030 wt %, 0.0006 to 0.0027 wt % or 0.001 to 0.0027 wt %.

The remaining component of the present invention is iron (Fe). However, since unintended impurities may be inevitably incorporated from the raw material or the surrounding environment in the typical manufacturing process, these impurities cannot be excluded. Since these impurities are known to a person with ordinary skill in the typical manufacturing process, all the contents thereof are not specifically mentioned in the present specification.

Meanwhile, the cold-rolled steel sheet of the present invention not only satisfies the above-described alloy composition, but also may have $W_{yf}$ of 2.0 to 15.0, which is defined by the following Equation 1.

$$W_{yf}=(41\times[C]+28\times[Al]+3.4\times[S])*(25\times[Ni]\times30\times[B])/(25\times[N]) \qquad \text{[Equation 1]}$$

In Equation 1, [C], [Al], [S], [Ni], [B] and [N] indicate the contents (wt %) of C, Al, S, Ni, B and N, respectively.

$W_{yf}$ is designed in consideration of the correlation of each element on welding workability and drawability. When $W_{yf}$ is too small, the degree of hardening of a welded portion structure is low, so that the workability is improved, but the welding strength and low-temperature toughness cannot be secured, so that the amount of alloying elements in the flux needs to be increased. Accordingly, the welding workability may deteriorate. In contrast, when $W_{yf}$ is too large, the hardness of the welded portion increases sharply, so that a welded member may break during the pipe making and drawing work. Therefore, it is preferred that $W_{yf}$ satisfies a range of 2.0 to 15.0. More specifically, for example, $W_{yf}$ may be in a range of 2.1 to 14.8.

The cold-rolled steel sheet according to an exemplary embodiment of the present invention has excellent elongation. Specifically, the elongation may be 40% or more. By satisfying such physical properties, the cold-rolled steel sheet may be preferably applied as a material for a flux-cored wire.

Specifically, a flux-cored wire is manufactured by continuously passing a cold-rolled steel sheet strip between rolls to increase the amount of bending deformation, then molding the steel sheet into a U-shaped bent member, and then supplying flux to the inside of the member. Thereafter, the flux-filled material is again allowed to continuously pass between rolls to produce a cylindrical shape whose inside is filled with flux, and a flux-cored wire is manufactured in the form of being drawn to a desired thickness by again pulling out the material in the longitudinal direction. Therefore, a high elongation is required in order to be applied as a material for a flux-cored wire.

When the elongation is too low, the reduction rate of the cross section is lowered during a drawing processing of a welding wire, so that there may be a problem in that pipe-making workability deteriorates and cracks such as tears occur during the processing. More specifically, the cold-rolled steel sheet according to an exemplary embodiment may have an elongation of 40% to 60%, 44% to 55%, or 45% to 55%.

The method for manufacturing a cold-rolled steel sheet for a flux-cored wire according to an exemplary embodiment of the present invention may include manufacturing a slab, heating the slab, obtaining a hot-rolled steel sheet by rolling the heated slab, winding the hot-rolled steel sheet, obtaining a cold-rolled steel sheet by cold rolling the wound hot-rolled steel sheet, and annealing the cold-rolled steel sheet.

Hereinafter, the method will be specifically described for each step.

First, a slab is manufactured. In the steelmaking step, C, Mn, Si, P, S, Al, N, Ni, B, and the like are controlled with appropriate contents. The molten steel whose components are adjusted in the steelmaking step is manufactured into a slab through continuous casting.

In this case, the manufactured slab may include: by wt %, 0.0005 to 0.01% of carbon (C), 0.05 to 0.25% of manganese (Mn), 0.03% or less (except for 0%) of silicon (Si), 0.0005 to 0.01% of phosphorus (P), 0.001 to 0.008% of sulfur (S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities.

Since each composition of the slab has been described in detail in the above-described cold-rolled steel sheet for a flux-cored wire, the duplicate description thereof will be omitted. The above-described Equation 1 may also be satisfied equally in the alloy component of the slab. Since the alloy component is not substantially changed in the manufacturing process of the cold-rolled steel sheet for a flux-cored wire, the alloy components of the slab and the finally manufactured cold-rolled steel sheet for a flux-cored wire may be the same.

Next, the slab is heated. This is to smoothly perform a subsequent hot rolling process and subject the slab to homogenization treatment. The slab may be heated to, for example, 1100 to 1300° C. When the slab heating temperature is too low, there is a problem in that the load increases sharply during a subsequent hot rolling. In contrast, when the slab heating temperature is too high, not only the energy cost increases, but also the amount of surface scale increases, which may lead to material loss. More specifically, the slab heating temperature may be in a range of 1150 to 1280° C.

Next, a hot-rolled steel sheet is manufactured by hot rolling the heated slab. In this case, a finishing rolling temperature of the hot rolling may be in a range of 890 to 900° C. When the finishing rolling temperature is too low, the crystal grains may be rapidly mixed as the hot rolling in the low-temperature region is finished, thereby leading to deterioration in hot rollability and workability. In contrast, when the finishing rolling temperature is too high, the peelability of the surface scale deteriorates and uniform hot rolling is not performed over the entire thickness, so that insufficient crystal grain refinement may result in a decrease in impact toughness due to crystal grain coarsening. More specifically, the finishing rolling temperature of the hot rolling may be in a range of 895 to 940° C.

Next, the hot-rolled steel sheet is wound. In this case, the winding temperature may be in a range of 550 to 700° C. After hot rolling and before winding, the hot-rolled steel sheet may be cooled on a run-out table (ROT). When the winding temperature is too low, the temperature inhomogeneity in the width direction causes a difference in the formation behavior of low-temperature precipitates during cooling and maintenance to induce material deviation and adversely affect workability. In contrast, when the winding temperature is too high, there is a problem such as softening of the surface material and deterioration of the pipe making workability as the structure of a final product is coarsened. More specifically, the winding temperature of the hot-rolled steel sheet may be in a range of 580 to 690° C.

After winding the hot-rolled steel sheet and before cold-rolling the wound hot-rolled steel sheet, the method may further include washing the wound hot-rolled steel sheet with an acid.

Next, a cold-rolled steel sheet is manufactured by cold rolling the wound hot-rolled steel sheet. In this case, the rolling reduction ratio may be in a range of 50 to 85%. When the rolling reduction ratio is too low, the driving force for recrystallization is so low that it is difficult to secure a uniform material such as local structure growth, and further, considering the thickness of a final product, there is a problem in that the hot rolling workability remarkably deteriorates because the work needs to be performed by lowering thickness of the hot-rolled steel sheet. In contrast, when the rolling reduction ratio is too high, there is a problem in that the material is hardened to cause cracks during drawing, and the cold rolling workability deteriorates due to the load of a rolling mill. Therefore, the rolling reduction ratio may be in a range of 50 to 85%, more specifically, in a range of 65 to 80%.

Next, the cold-rolled steel sheet is annealed. By performing annealing from a state where the strength is increased due to the deformation introduced from cold rolling, the target strength and workability may be secured. In this case, the annealing temperature may be 700 to 850° C. When the annealing temperature is too low, there is a problem in that the workability is remarkably reduced as a deformation formed by cold rolling is not sufficiently removed. In contrast, when the annealing temperature is too high, there may be a problem with annealing mass flow such as strip breakage. More specifically, the annealing temperature may be 730 to 845° C. Annealing may be continuously performed without winding the cold-rolled steel sheet.

After the annealing of the cold-rolled steel sheet, temper-rolling the annealed cold-rolled steel sheet may be further included. Although the shape of the material may be controlled and the target surface roughness may be obtained through temper rolling, there is a problem in that when the temper rolling reduction ratio is too high, the material is cured but workability deteriorates, so that temper rolling may be applied at a rolling reduction ratio of 3% or less. More preferably, the rolling reduction ratio of the temper rolling may be 0.3 to 2.0%.

After a cold-rolled steel sheet is annealed, the annealed sheet may be used for manufacturing a flux-cored wire. That is, according to another exemplary embodiment, it is possible to provide an outer skin made of a cold-rolled steel sheet according to an exemplary embodiment and a flux cored wire filled inside the outer skin.

The effect of the flux-cored wire according to an exemplary embodiment of the present invention is the effect exhibited by the cold-rolled steel sheet regardless of the type of filled flux. Therefore, as the flux, a general flux used in the field of flux-cored wire can be used without limitation. Since flux is widely known, the detailed description thereof will be omitted.

Next, the flux-cored wire has an excellent welded portion segregation index. The welded portion segregation index is expressed as the ratio of an area occupied by the segregation due to the added elements to a total area of the welded portion. Specifically, the welded portion segregation index may be 0.15% or less. More specifically, for example, the cold-rolled steel sheet may have a welded portion segregation index of 0.005 to 0.13%.

Further, the flux-cored wire has excellent low-temperature impact energy at −20° C. Specifically, the low-temperature impact energy at −20° C. may be 50 Joule (J) or more. In a low-temperature environment, the welded portion may be a factor that causes cracks due to a low-temperature shock or the like, and thus may cause a problem with the safety of a welded structure. Therefore, a certain amount of impact energy needs to be secured in the low-temperature region. More specifically, the low-temperature impact energy at −20° C. may be, for example, 50 J to 130 J, or 55 J to 110 J.

Meanwhile, according to still another exemplary embodiment, it is possible to provide a welded member welded using the flux-cored wire according to an exemplary embodiment. The welded member has excellent yield strength at the welded portion. The yield strength of the welded portion needs to maintain a suitable level regardless of a base material, and when the yield strength is applied to a structural member, high strength characteristics of 440

MPa or more need to be secured in terms of securing the stability of the welded portion. The welded portion yield strength of the welded member may be more specifically in a range of 440 MPa to 600 MPa or 440 MPa to 550 MPa.

Hereinafter, exemplary embodiments of the present invention will be described in detail. However, the exemplary embodiments are suggested as an example, the present invention is not limited thereby, and the present invention is defined only by the scope of the claims to be described below.

EXAMPLES AND COMPARATIVE EXAMPLES

A slab consisting of the alloy components, the balance Fe, and unavoidable impurities summarized in the following [Table 1] was manufactured. Next, after the slab was heated to 1230° C., hot rolling, winding, cold rolling and annealing processes were performed under manufacturing conditions summarized in the following [Table 2]. The annealed sheet thus manufactured was subjected to temper rolling by applying a temper rolling reduction ratio of 0.9%.

TABLE 1

| Steel type | Alloy composition (wt %) | | | | | | | | | $W_{yf}$ value[*)] |
|---|---|---|---|---|---|---|---|---|---|---|
| | C | Mn | Si | P | S | Al | N | Ni | B | |
| Inventive Steel 1 | 0.0014 | 0.14 | 0.011 | 0.005 | 0.002 | 0.004 | 0.0018 | 0.76 | 0.0025 | 5.580 |
| Inventive Steel 2 | 0.0019 | 0.11 | 0.017 | 0.002 | 0.004 | 0.002 | 0.0024 | 1.37 | 0.0011 | 2.779 |
| Inventive Steel 3 | 0.0026 | 0.19 | 0.008 | 0.007 | 0.003 | 0.006 | 0.0016 | 0.89 | 0.0016 | 7.604 |
| Inventive Steel 4 | 0.0034 | 0.08 | 0.015 | 0.004 | 0.006 | 0.003 | 0.0026 | 0.97 | 0.0023 | 6.276 |
| Inventive Steel 5 | 0.0031 | 0.15 | 0.004 | 0.003 | 0.003 | 0.005 | 0.0012 | 1.03 | 0.0019 | 13.567 |
| Comparative Steel 1 | 0.0027 | 0.16 | 0.009 | 0.035 | 0.006 | 0.019 | 0.0024 | 1.15 | 0.0000 | 0.000 |
| Comparative Steel 2 | 0.0031 | 0.19 | 0.012 | 0.005 | 0.024 | 0.006 | 0.0015 | 0.00 | 0.0018 | 0.000 |
| Comparative Steel 3 | 0.0118 | 0.36 | 0.015 | 0.003 | 0.006 | 0.032 | 0.0018 | 0.87 | 0.0016 | 32.485 |
| Comparative Steel 4 | 0.0372 | 0.15 | 0.242 | 0.004 | 0.007 | 0.007 | 0.0061 | 0.11 | 0.0001 | 0.094 |
| Comparative Steel 5 | 0.0415 | 0.45 | 0.017 | 0.009 | 0.037 | 0.042 | 0.0021 | 0.19 | 0.0045 | 36.683 |
| Comparative Steel 6 | 0.0682 | 0.12 | 0.021 | 0.045 | 0.004 | 0.005 | 0.0014 | 1.81 | 0.0005 | 57.205 |

[*)]calculated as wt % for each alloying element by $W_{yf} = (41 \times [C] + 28 \times [Al] + 3.4 \times [S])$
* $(25 \times [Ni] \times 30 \times [B])/(25 \times [N])$

TABLE 2

| Classification | Steel type No. | Finishing hot-rolling temperature (° C.) | Winding temperature (° C.) | Cold-rolling reduction ratio (%) | Annealing temperature (° C.) |
|---|---|---|---|---|---|
| Inventive Example 1 | Inventive Steel 1 | 900 | 680 | 66 | 760 |
| Inventive Example 2 | Inventive Steel 1 | 900 | 680 | 73 | 800 |
| Inventive Example 3 | Inventive Steel 1 | 900 | 680 | 75 | 840 |
| Inventive Example 4 | Inventive Steel 2 | 920 | 620 | 73 | 750 |
| Inventive Example 5 | Inventive Steel 2 | 920 | 620 | 73 | 820 |
| Inventive Example 6 | Inventive Steel 3 | 930 | 660 | 70 | 800 |
| Inventive Example 7 | Inventive Steel 4 | 920 | 600 | 78 | 800 |
| Inventive Example 8 | Inventive Steel 5 | 920 | 600 | 75 | 780 |
| Inventive Example 9 | Inventive Steel 5 | 920 | 600 | 75 | 780 |
| Comparative Example 1 | Inventive Steel 1 | 820 | 680 | 73 | 600 |
| Comparative Example 2 | Inventive Steel 1 | 900 | 680 | 40 | 750 |
| Comparative Example 3 | Inventive Steel 2 | 920 | 460 | 91 | 820 |

TABLE 2-continued

| Classification | Steel type No. | Finishing hot-rolling temperature (° C.) | Winding temperature (° C.) | Cold-rolling reduction ratio (%) | Annealing temperature (° C.) |
|---|---|---|---|---|---|
| Comparative Example 4 | Inventive Steel 3 | 930 | 760 | 70 | 900 |
| Comparative Example 5 | Comparative Steel 1 | 920 | 620 | 70 | 800 |
| Comparative Example 6 | Comparative Steel 2 | 900 | 620 | 70 | 800 |
| Comparative Example 7 | Comparative Steel 3 | 900 | 620 | 70 | 800 |
| Comparative Example 8 | Comparative Steel 4 | 900 | 620 | 70 | 800 |
| Comparative Example 9 | Comparative Steel 5 | 900 | 620 | 70 | 800 |
| Comparative Example 10 | Comparative Steel 6 | 900 | 620 | 45 | 800 |

EXPERIMENTAL EXAMPLES

Table

The elongation, mass flow, and drawability of cold-rolled steel sheets manufactured under the conditions shown in Table 2 were measured, and are shown in the following [Table 3].

(1) The elongation was determined by measuring the amount of deformation until a test piece was broken while pulling the test piece with a gauge length of 50 mm to 10 mm per minute using a universal tensile tester.

(2) The mass flow was displayed as "0" when there was no rolling load during cold and hot rolling and no defects such as heat buckle occurred during continuous annealing, and was displayed as "X" when a rolling load occurred or defects such as strip breakage occurred during continuous annealing.

(3) The drawability was displayed as "poor" when a processing defect such as a tear occurred during the drawing process of a flux-cored wire with a cross-sectional reduction rate of 61%, and "good" when no processing defect occurred.

(4) In addition, after a strip with a width of 14 mm was manufactured using the manufactured cold-rolled steel sheet, this strip was processed into a U-shape and filled with a flux component, and then an O-shaped welding material with a diameter of 3.1 mm was manufactured. A flux-cored wire having a diameter of 1.2 mm was manufactured by drawing out the welding material thus manufactured, and by using the flux-cored wire, a low-temperature impact experiment and a tensile experiment were performed and a welded portion segregation index was measured, and the results are shown in the following Table 3.

(5) Then, after the welding workability for the welded member welded with the flux-cored wire was determined, the results are shown in the following Table 3. In this case, the welded member was drawn out with a wire having a diameter of 1.2 mm, and this is the result of a test conducted on welded portions manufactured under the conditions of a voltage of 29 volts, a current of 150 to 180 A, and a welding speed of 40 cm per minute using a pilot welding machine. In the case of welding workability, in manufacturing these welded members, welding workability was displayed as "poor" when a workability deterioration phenomenon such as a spatter phenomenon occurred, and "good" when the workability deterioration phenomenon did not occur.

TABLE 3

| Classification | Mass flow | Elongation (%) | Welded portion segregation index (%) | Impact toughness (J, @-20° C.) | Welded member yield strength (MPa) | Drawability | Welding workability |
|---|---|---|---|---|---|---|---|
| Inventive Example 1 | ○ | 46 | 0.09 | 87 | 481 | Good | Good |
| Inventive Example 2 | ○ | 48 | 0.08 | 91 | 472 | Good | Good |
| Inventive Example 3 | ○ | 49 | 0.09 | 99 | 470 | Good | Good |
| Inventive Example 4 | ○ | 47 | 0.02 | 89 | 494 | Good | Good |
| Inventive Example 5 | ○ | 50 | 0.04 | 95 | 509 | Good | Good |
| Inventive Example 6 | ○ | 45 | 0.05 | 96 | 497 | Good | Good |
| Inventive Example 7 | ○ | 50 | 0.07 | 94 | 524 | Good | Good |
| Inventive Example 8 | ○ | 47 | 0.03 | 91 | 515 | Good | Good |
| Inventive Example 9 | ○ | 48 | 0.06 | 88 | 549 | Good | Good |

TABLE 3-continued

| Classification | Mass flow | Elongation (%) | Welded portion segregation index (%) | Impact toughness (J, @-20° C.) | Welded member yield strength (MPa) | Drawability | Welding workability |
|---|---|---|---|---|---|---|---|
| Comparative Example1 | X | 24 | 0.16 | 39 | 382 | Poor | Poor |
| Comparative Example2 | X | 31 | 0.18 | 45 | 374 | Poor | Poor |
| Comparative Example3 | X | 36 | 0.15 | 47 | 391 | Poor | Poor |
| Comparative Example4 | X | 28 | 0.14 | 41 | 392 | Poor | Good |
| Comparative Example5 | ○ | 43 | 0.19 | 26 | 369 | Good | Poor |
| Comparative Example6 | ○ | 38 | 0.62 | 32 | 381 | Poor | Poor |
| Comparative Example7 | ○ | 39 | 0.31 | 46 | 406 | Poor | Poor |
| Comparative Example8 | ○ | 38 | 0.48 | 37 | 382 | Poor | Poor |
| Comparative Example 9 | ○ | 28 | 0.53 | 42 | 423 | Poor | Poor |
| Comparative Example 10 | X | 30 | 0.17 | 45 | 417 | Good | Poor |

As can be seen from [Table 1] to [Table 3], it can be confirmed that Inventive Examples 1 to 9, which satisfy each condition of the alloy composition and the manufacturing process, not only have good mass flow, but also have an elongation of 40% or more, which is the material standard for a target cold-rolled steel sheet for a flux-cored wire welding rods, and a segregation index of a wire manufactured by the welded member of 0.15% or less. That is, no tears or cracks occurred in the welded portion during a secondary processing, so that not only excellent workability could be secured, but also welding workability could also obtain a good result.

Furthermore, the impact energy at −20° C. was also 50 J or more, and the yield strength of the welded member was 440 MPa or more, so that excellent strength and low-temperature toughness could be secured.

In contrast, Comparative Examples 1 to 4 are cases where the alloy composition presented in the present invention were satisfied, but the manufacturing process conditions were not satisfied, and have a problem in that the rolling mass flow (Comparative Examples 1 to 3) and the annealing mass flow (Comparative Example 4) were poor. In addition, it was confirmed that the elongation was low compared to the target, the yield strength of the welded member was less than 440 MPa, the impact energy value at −20° C. was 50 J or less, or the drawability of the welded member was poor, so that the characteristics of the target cold-rolled steel sheet for a flux cored wire could not be secured as a whole.

Comparative Examples 5 to 9 are cases where the manufacturing process conditions presented in the present invention are satisfied but the alloy composition is not satisfied, and Comparative Example 10 is a case where none of alloy composition and manufacturing process conditions are satisfied. Most of Comparative Examples 5 to 10 could not satisfy the target elongation, welded portion segregation index, impact energy, welded portion yield strength and drawability of the present invention, and in the case of Comparative Example 10, the mass flow was not good either, and in most cases, there was a problem in that the welding workability also deteriorated.

The present invention is not limited to the Examples, but may be prepared in various forms, and a person with ordinary skill in the art to which the present invention pertains will understand that the present invention can be implemented in another specific form without changing the technical spirit or essential feature of the present invention. Therefore, it should be understood that the above-described Examples are illustrative only in all aspects and are not restrictive.

The invention claimed is:

1. A cold-rolled steel sheet for a flux-cored wire, comprising: by wt %, 0.0005 to 0.01% of carbon (C), 0.05 to 0.25% of manganese (Mn), 0.03% or less, except for 0%, of silicon (Si), 0.0005 to 0.01% of phosphorus (P), 0.001 to 0.008% of sulfur(S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities.

2. The cold-rolled steel sheet of claim 1, wherein $W_{yf}$ defined by the following Equation 1 is 2.0 to 15.0;

$$W_{yf}=(41\times[C]+28\times[Al]+3.4\times[S])*(25\times[Ni]\times30\times[B])/(25\times[N]) \qquad \text{[Equation 1]}$$

in Equation 1, [C], [Al], [S], [Ni], [B] and [N] indicate the contents (wt %) of C, Al, S, Ni, B and N, respectively.

3. The cold-rolled steel sheet of claim 1, wherein the cold-rolled steel sheet has an elongation of 40% or more.

4. A method for manufacturing a cold-rolled steel sheet for a flux-cored wire of claim 1, the method comprising: manufacturing a slab comprising: by wt %, 0.0005 to 0.01% of carbon (C), 0.05 to 0.25% of manganese (Mn), 0.03% or less except for 0% of silicon (Si), 0.0005 to 0.01% of phosphorus (P), 0.001 to 0.008% of sulfur(S), 0.0001 to 0.010% of aluminum (Al), 0.0005 to 0.003% of nitrogen (N), 0.5 to 1.7% of nickel (Ni), 0.0005 to 0.0030% of boron (B), and the balance Fe and inevitable impurities;

heating the slab;

obtaining a hot-rolled steel sheet by hot rolling the heated slab such that a finishing hot rolling temperature is 890 to 950° C.;

winding the hot-rolled steel sheet in a temperature range of 550 to 700° C.;

obtaining a cold-rolled steel plate by cold rolling the wound hot-rolled steel plate at a rolling reduction ratio of 50 to 85%; and annealing the cold-rolled steel sheet in a temperature range of 700 to 850° C.

5. The method of claim 4, wherein the slab has a $W_{yf}$ of 2.0 to 15.0, which is defined by the following Equation 1;

$$W_{yf}=(41\times[C]+28\times[Al]+3.4\times[S])^*(25\times[Ni]\times30\times[B])/(25\times[N]) \qquad \text{[Equation 1]}$$

in Equation 1, [C], [Al], [S], [Ni], [B] and [N] indicate the contents (wt %) of C, Al, S, Ni, B and N, respectively.

6. The method of claim 4, wherein in the obtaining of the cold-rolled steel sheet, the rolling reduction ratio is in a range of 65 to 80%.

7. The method of claim 4, wherein the annealing of the cold-rolled steel sheet is performed in a range of 730 to 845° C.

8. The method of claim 4, further comprising, after the annealing of the cold-rolled steel sheet, temper-rolling the annealed cold-rolled steel sheet.

9. A flux-cored wire comprising: an outer skin made of the cold-rolled steel sheet described in claim 1; and a flux filled inside the outer skin.

10. The flux-cored wire of claim 9, wherein the flux-cored wire has an impact energy of 50 J or more at −20° C.

11. The flux-cored wire of claim 9, wherein the flux-cored wire has a welded portion segregation index of 0.15% or less.

12. A welded member welded using the flux-cored wire of claim 9 and having a yield strength of 440 MPa or more.

13. The cold-rolled steel sheet of claim 1, comprising 1.03 to 1.7% of nickel (Ni).

14. The cold-rolled steel sheet of claim 1, comprising 1.37 to 1.7% of nickel (Ni).

* * * * *